United States Patent [19]

Matsunaga

[11] Patent Number: 4,761,651
[45] Date of Patent: Aug. 2, 1988

[54] PULSE DISCRIMINATING SYSTEM FOR REPLY SIGNALS IN A TRANSPONDER

[75] Inventor: Masaharu Matsunaga, Kanagawa, Japan

[73] Assignee: Toyo Communication Equipment Co., Ltd., Kanagawa, Japan

[21] Appl. No.: 928,221

[22] PCT Filed: Feb. 14, 1986

[86] PCT No.: PCT/JP86/00068
§ 371 Date: Oct. 15, 1986
§ 102(e) Date: Oct. 15, 1986

[87] PCT Pub. No.: WO86/05051
PCT Pub. Date: Aug. 28, 1986

[30] Foreign Application Priority Data

Feb. 15, 1985 [JP] Japan .................................. 60-28876

[51] Int. Cl.$^4$ ............................................ G02S 13/74
[52] U.S. Cl. ...................................................... 342/40
[58] Field of Search ........................................... 342/40

[56] References Cited

U.S. PATENT DOCUMENTS

| 3,188,629 | 6/1965 | Humphreys | 342/40 |
| 3,696,415 | 10/1972 | Ballantyne | 342/40 |
| 3,732,563 | 5/1973 | Nelson | 342/40 |
| 3,801,980 | 4/1974 | Danton et al. | 342/40 X |
| 3,866,221 | 2/1975 | Hikosaka | 342/40 |

FOREIGN PATENT DOCUMENTS 2021895 12/1979 United Kingdom .................. 342/40

Primary Examiner—T. H. Tubbesing
Attorney, Agent, or Firm—Wenderoth, Lind & Ponack

[57] ABSTRACT

A pulse discriminating system for reply signals and the like in transponders which may independently and correctly discriminate respective pulse trains in the case where a plurality of reply signals are overlapping with respect to time in the transponders. The pulse discriminating system for reply signals and the like in transponders according to the present invention is operated by controlling the gate circuits thereof under a predetermined condition.

3 Claims, 4 Drawing Sheets

PULSE DISCRIMINATING SYSTEM FOR REPLY SIGNALS IN A TRANSPONDER

BACKGROUND OF THE INVENTION

1. Field of the Invention

This invention relates to a pulse discriminating system for reply signals and the like in transponders, and more particularly to a pulse discriminating system for reply signals and the like which can independently and correctly discriminate between respective pulse trains in the case where a plurality of reply signals overlap each other with respect to time in onboard transponders in aircraft.

2. Description of the Prior Art

In general, for air traffic control, principal aircraft are equipped with transponders and when a interrogation signal transmitted by a ground control system and the like is received by such aircraft, they send back prescribed information such as its identity, altitude and the like.

In a particular case, similar information is also exchanged between aircraft. One example of a signal handled in such a transponder as described above is as illustrated in FIG. 3 which shows an example of a transponder reply signal in the so-called mode C wherein 15 pulses at maximum, each having a width of 0.45 $\mu$s, are arranged with a spacing of 1.45 $\mu$s.

Among them, the first and least pulses $F_1$ and $F_2$ are referred to as bracket pulses (BKT) and are fixed. An interval between these BKT pulses $F_1$ and $F_2$ is 20.3 $\mu$s, and 13 pulses $C_1, A_1, A_2, \ldots, D_4$ are arranged between the former pulses as shown in FIG. 3. Logic "1" or "0" is assigned in response to the presence of pulses at the respective positions to encode advanced information and the like so as to display them.

In decoding an information signal which has been encoded by means of such a pulse train, it is necessary for the presence of a pulse at the respective positions to be detected. In this connection, heretofore, a pulse discriminating circuit to be used for the above case has generally been constructed from a 20.3 $\mu$s delay circuit $DL_1$ and a required number of AND circuits (AND gates) as shown in FIG. 2.

More specifically, two signals, one of which is the reply signal itself and the other is a reply signal which has been delayed by 20.3 $\mu$s by causing the former to pass through said delay circuit $DL_1$ are inputted to an AND circuit (AND gate) $Q_a$ to obtain BKT as its AND output and, at the same time, to input each output obtained from thirteen taps provided in said delay circuit $DL_1$ and delayed by 1.45 $\mu$s in a tap into one input terminal of each of a total of thirteen AND gates $Q_b$ to $Q_n$, respectively, whilst BKT (bracket pulses) outputted from said AND gate $Q_a$ is inputted to each of the other input terminals of each of said thirteen gates, whereby discriminated thirteen information pulses are output at the outputs of these AND gates $Q_b$ to $Q_n$.

In order to facilitate understanding of the present invention, operation in the above-mentioned circuit construction shown in FIG. 2 will be described in detail hereinbelow by referring to the timing chart shown in FIG. 4.

The timing chart consisting of FIGS. 4(a) through (g) indicates the timing relationship of the input and output of the delay circuit $DL_1$ in FIG. 2 as well as pulses output at the respective taps wherein (a) designates the input reply signal, (b) through (f) designate the thirteen tap outputs derived therefrom with each 1.45 $\mu$s delay interval, and (g) designates the output signal at the output of said delay circuit $DL_1$, respectively.

First, since AND of pulse trains indicated by FIGS. 4(a) and (g) is obtained in the first AND gate $Q_a$, a pulse output having 0.45 $\mu$s width, i.e., a BKT pulse is output as the AND of both the last pulse at (a), i.e., $F_2$ and the first pulse delayed by 20.3 $\mu$s at (g), i.e., $F_1$. $F_1$ and $F_2$ are positively present as bracket pulse as mentioned above, so that the output "1" is inevitably obtained at the output of said AND gate $Q_a$.

Next, the BKT pulse is inputted to each of the other thirteen inputs of the second AND gate $Q_b$ to the fourteenth AND gate $Q_n$. For example, these AND gates function such that the AND gate $Q_b$ outputs an AND output derived from said BKT pulse and the second pulse shown in FIG. 4(b), i.e., the $C_1$ pulse, further the AND gate $Q_c$ outputs AND of the BKT pulse and the third pulse indicated in FIG. 4(c), i.e., the $A_1$ pulse, and the AND gate $Q_d$ outputs AND derived from the fourth pulse indicated in FIG. 4(d), i.e., the $C_2$ pulse. Thus, the AND output of such pulses which have been successively delayed as described above and the BKT pulse form a pulse train delivered successively every 1.45 $\mu$s time interval in a time serial manner is obtained as a parallel pulse signal after a delaying time interval of 20.3 $\mu$s. As a result, "1" is obtained if a pulse exists in respective pulse positions and if not, "0" is obtained at the respective AND gates so that information delivered from a transmitter can be discriminated and reproduced.

In such conventional pulse discriminating method as mentioned above, however, when a plurality of reply signals are garbled, they cannot be discriminated, and there is a fear of erroneous decoding.

Namely, if the case where two reply signals #1 and #2 with only a small time difference therebetween is taken as an example as shown in FIG. 5, these two signal pulses are received as the sum of both pulses as indicated in FIG. 5 #1 and #2.

Hence, there is a problem that when the signal as described above is decoded by the use of said conventional discriminating circuit, an AND signal based on #1 and #2 signals is output, but such AND signal is quite different from that derived from said #1 and #2 pulse trains so that this becomes a cause of an erroneous decoding.

Accordingly, the present invention has been made to eliminate the problems involved in the pulse discriminating system for reply signals and the like in the conventional transponders as described above, and an object of the present invention is to provide a pulse discriminating system for reply signals and the like in transponders.

DISCLOSURE OF THE INVENTION

According to the present invention, only pulse trains belonging to a first incoming signal with respect to time from among a plurality of signals are discriminated through a gate circuit which opens only for a prescribed period of time by means of the reference pulse of said first incoming signal; thereafter, only information pulses belonging to another incoming signal delayed a small amount from said first or the following incoming signal is discriminated through another gate circuit which opens only for a prescribed period of time by means of said information pulse, and at the same time each period of time for opening said respective gate circuits is set in relation to the allowable jitter of each information pulse, whereby respective pulse trains can be independently and correctly discriminated in the case where a plurality of reply signals are garbled.

DESCRIPTION OF THE PREFERRED EMBODIMENT OF THE INVENTION

In order to describe more fully the present invention, it will be described hereinbelow by referring to the accompanying drawings.

Figure 1A:
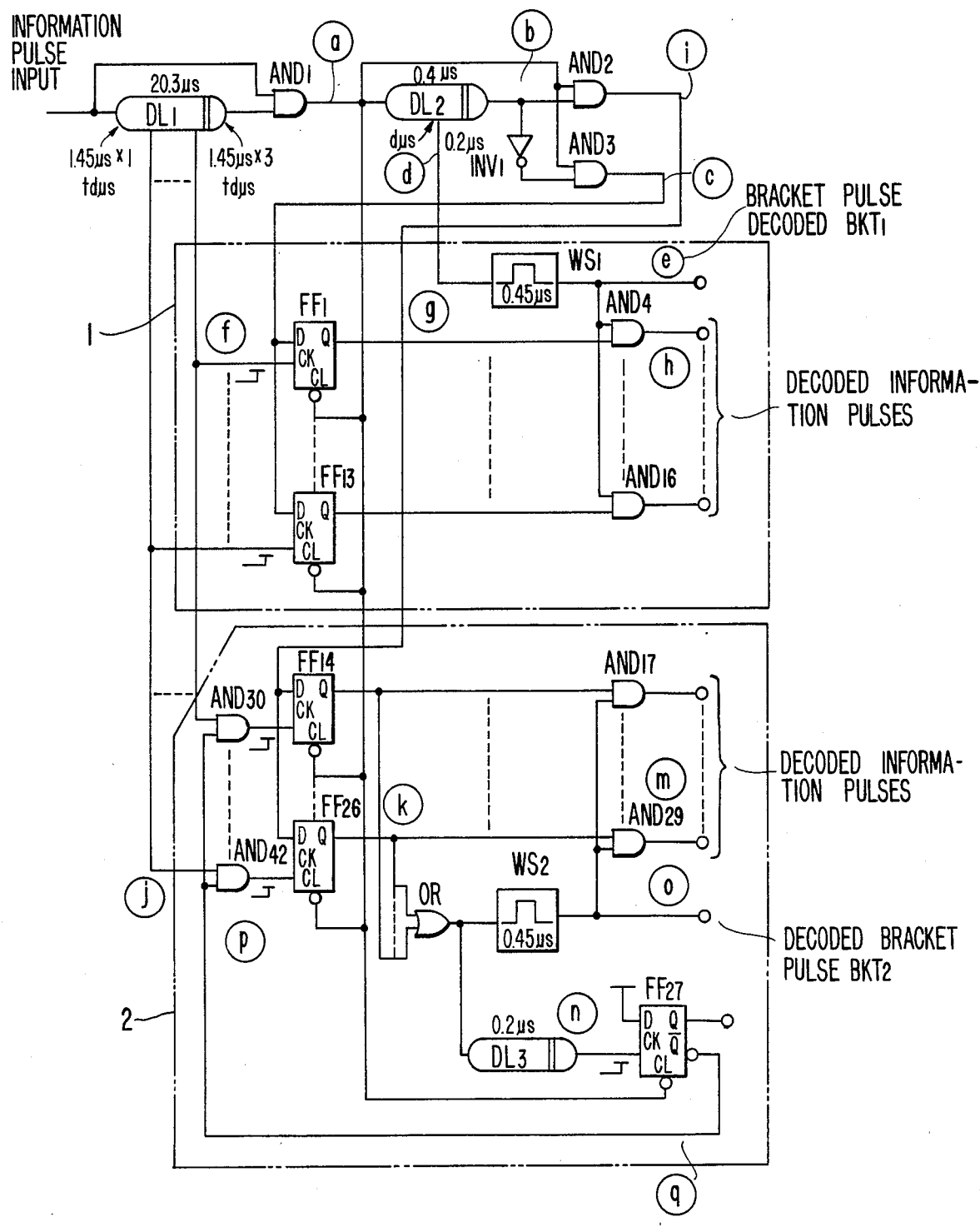
FIG. 1A and FIG. 1B are a circuit diagram illustrating an embodiment of the pulse signal discriminating circuit according to the present invention and a timing chart for explaining the operation thereof, respectively.
Figure 2:
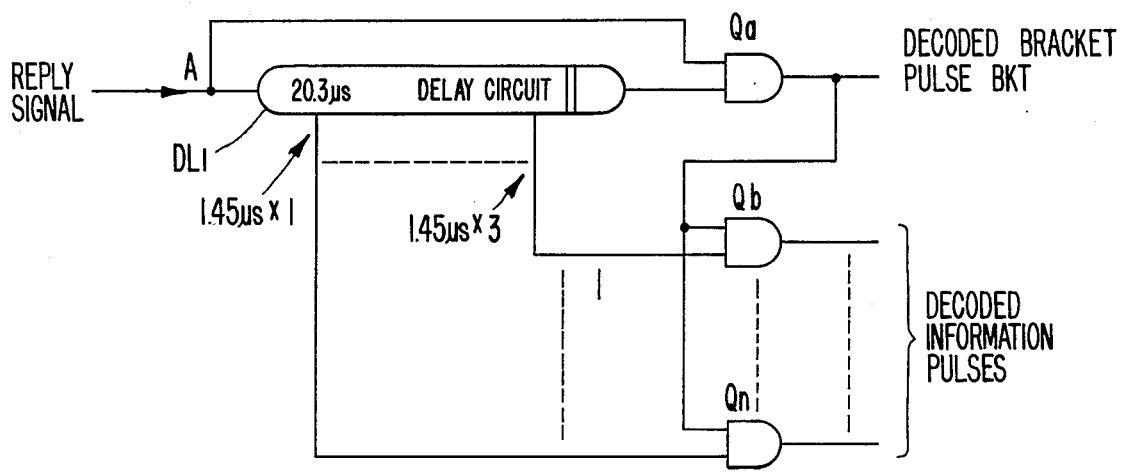
FIG. 2 is a circuit diagram showing a conventional pulse signal discriminator.
Figure 3:
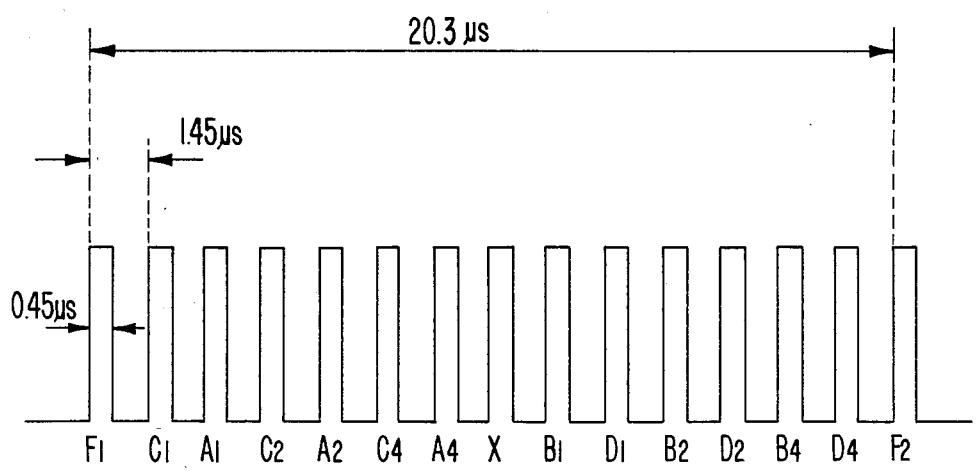
FIG. 3 is an explanatory view showing pulse signals in mode C in a transponder.
Figure 4:
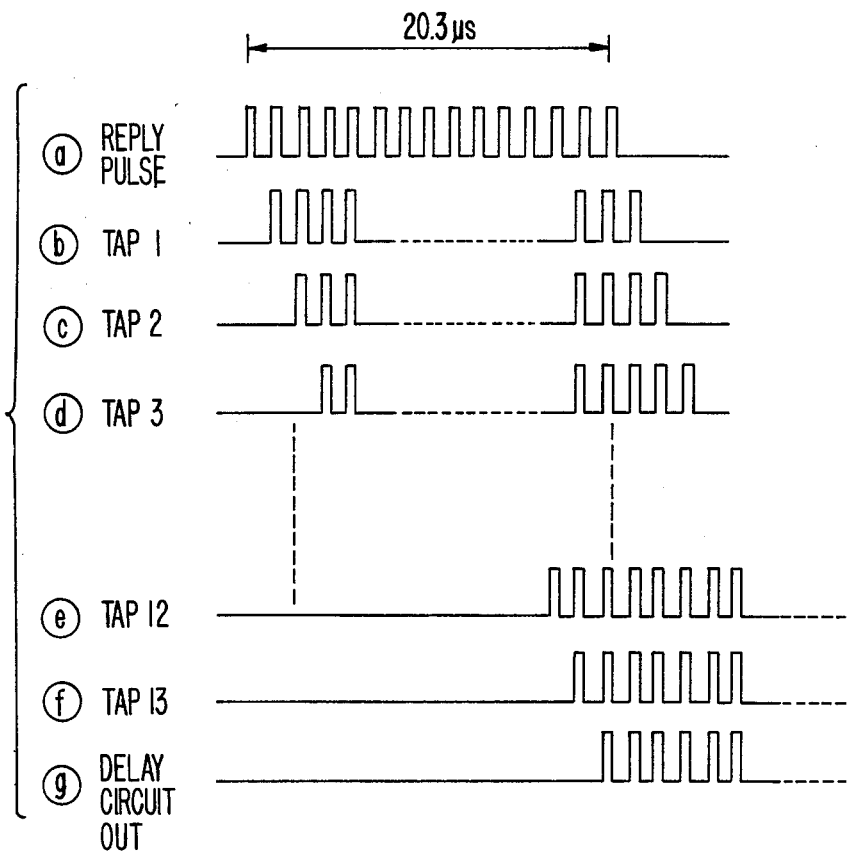
FIG. 4 is a timing chart illustrating the operation of the conventional discriminator shown in FIG. 2.

FIG. 1A is a circuit diagram illustrating an embodiment of the present invention wherein reference characters $DL_1$ and $AND_1$ designate a 20.3 $\mu s$ delay circuit having thirteen intermediate output taps as in the case of the conventional circuit shown in FIG. 2 and an AND gate, respectively. In this case, two signals consisting of the output from said delay circuit $DL_1$ and said information pulse are applied to the inputs of the AND gate $AND_1$. Furthermore, the output from the AND gate $AND_1$ is connected to a delay circuit $DL_2$ having twice the delay time of the allowable jitter time d ($\mu s$) of an information pulse to be handled and to inputs of second and third AND gates, $AND_2$ and $AND_3$; at the same time, the output from said second delay circuit $DL_2$ is inputted to the other input of said second AND gate $AND_2$, and the output from said delay circuit $DL_2$ is inputted to the other input of said third AND gate $AND_3$ through an inverter circuit $INV_1$, respectively.

In addition, a suitable number (two in the present embodiment) of pulse decoding circuit blocks 1 and 2 are provided, and the number corresponds to the number of overlapping incoming information signals of an information pulse signal which is to be discriminated and decoded.

These pulse decoding circuit blocks 1 and 2 have substantially the same construction. First, the pulse decoding circuit block 1 will be described hereinbelow. The pulse decoding circuit block 1 comprises number corresponding to the pulse number of said information pulses, i.e., thirteen, in this case, of edge trigger flip-flop circuits (ET.FF) $F.F_1$ through $F.F_{13}$, thirteen AND gates $AND_4$ through $AND_{16}$ each having an input which received a respective Q output from one of said ET.FF circuits $F.F_1$ through $F.F_{13}$, and a waveform shaping circuit $WS_1$ as shown in FIG. 1A. Outputs from thirteen intermediate taps of said first delay circuit $DL_1$ are inputted to the clock inputs (CK) of said ET.FF circuits $FF_1$ to $FF_{13}$ in a 1:1 proportion; furthermore, the output from said third AND gate $AND_3$ and the output from said first AND gate $AND_1$ are commonly inputted to the data input (D terminal) of said ET.FF and a clear terminal (CL), respectively. Q outputs of said ET.FF are inputted to one input of each of the thirteen AND gates $AND_4$ to $AND_{16}$ respectively, and intermediate tap outputs affording ½ delay time with respect to that of said delay circuit $DL_2$, i.e., a delay time of allowable jitter d ($\mu s$) from said second delay circuit $DL_2$ are inputted to another input of each of the aforesaid thirteen AND gates through said waveform shaping circuit $WS_1$, and at the same time the output of said waveform shaping circuit $WS_1$ as well as the outputs of said thirteen AND gates $AND_4$ to $AND_{16}$ are output as the bracket decoding pulse $BKT_1$ for the first information pulse signal and as the decoding pulses $C_1$, $A_1$, $A_2$, ... $D_4$ for said information pulse signals, respectively.

On one hand, the second pulse decoding circuit block 2 comprises a thirteen input OR circuit to which are inputted respective Q outputs of thirteen ET.FF circuits $FF_{14}$ through $FF_{26}$; in addition to said thirteen ET.FF circuits, thirteen AND gates $AND_{17}$ through $AND_{29}$ each having an input to which is respectively inputted a Q output of one of said ET.FF circuits, and a waveform shaping circuit $WS_2$ as in the case of said first pulse decoding circuit block 1. The output of said thirteen input OR circuit is inputted to said second waveform shaping circuit $WS_2$ and a third delay circuit $DL_3$. The output of said waveform shaping circuit $WS_2$ is the second bracket decoding pulse $BKT_2$, and at the same time the output is commonly inputted to each of other inputs of said AND gates $AND_{17}$ through $AND_{29}$. Furthermore, outputs obtained from the AND gates $AND_{17}$–$AND_{29}$ are used as the information decoding pulses $C_1$, $A_1$, $A_2$, ... $D_4$ for the second information pulse. Said construction is such that the output from said third delay circuit $DL_3$ is inputted to a CK terminal of a twenty-seventh ET.FF circuit $FF_{27}$, the $\overline{Q}$ output therefrom is inputted to one input of each of thirteen AND gates $AND_{30}$ to $AND_{42}$ which are inserted into the preceeding stages to the respective CK terminals of said thirteen ET.FF circuits $FF_{14}$ to $FF_{26}$, and at the same time, thirteen intermediate tap outputs from said first delay circuit $DL_1$ are connected to the other inputs of each of said AND gates $AND_{30}$ to $AND_{42}$ in a 1:1 proportion, whereby the outputs from said AND gates and the output from said second AND gate $AND_2$ are commonly inputted to the CK terminals of said ET.FF circuits $FF_{14}$ to $FF_{26}$ and the D terminals of thirteen FF circuits, respectively.

Operation of the discriminating circuit constructed as described above will be described in detail hereinbelow by referring to the time chart of FIG. 1B.

Figure 1B:
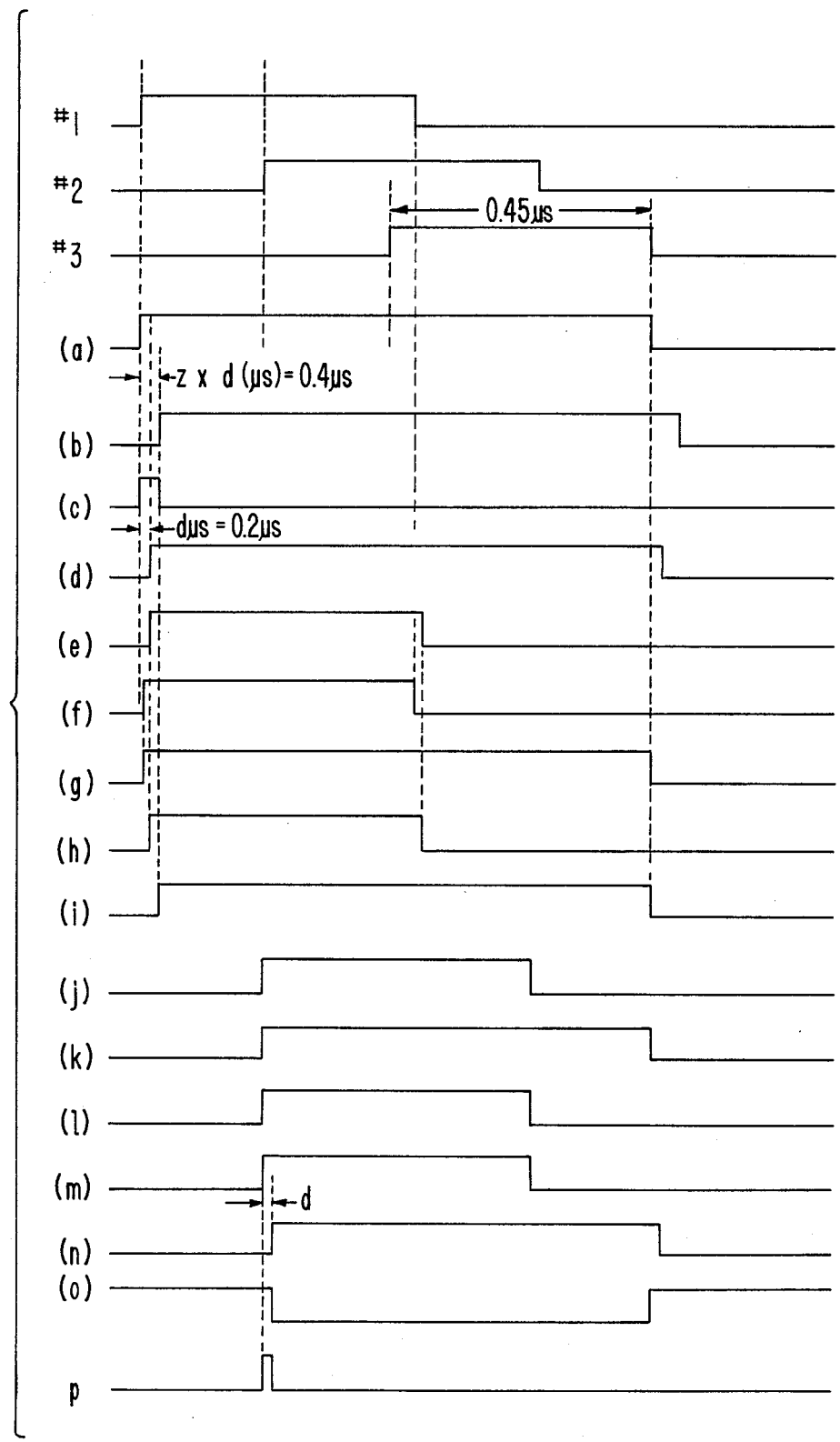

FIG. 1B is the time chart for explaining the operation of the circuit diagram shown in FIG. 1A and which illustrates waveforms in portions represented by the respective reference characters of FIG. 1A.

First, the case where three information pulses having only small time differences are inputted to the input of the first delay circuit $DL_1$ in FIG. 1A while they overlap each other will be studied.

Figure 5:
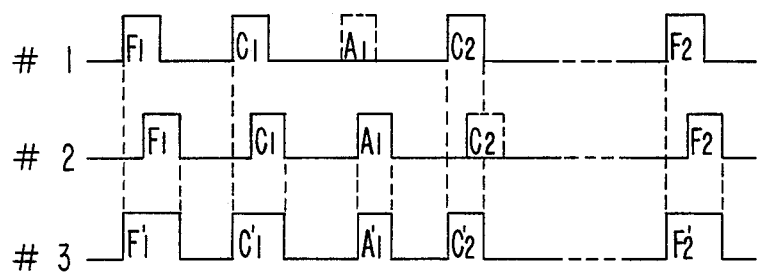
FIG. 5 is a timing chart indicating inconvenience in the case where signals overlap.

When the total of three information pulse trains including #3 signal pulse with a small delay in addition to #1 and #2 signal pulses illustrated in FIG. 5 arrive, pulse (a) as shown in FIG. 1B is successively outputted at the output of said first AND gate $AND_1$ as the sum of three bracket pulses #1, #2 and #3 in FIG. 1B. The output signal of $AND_3$ is the product of signal (b) produced by passing said pulse (a) through said second delay circuit $DL_2$ as shown in FIG. 1B (b) and inverted logical value of said pulse (b) using the inverter $INV_1$, and the output pulse as above is a pulse having twice the width of said allowable jitter d, i.e., such pulse having a 0.4 μs width in the present embodiment as illustrated at (c) in FIG. 1B. Such a pulse of 2×d (μs) width is to be commonly inputted to data terminals D of the ET.FF circuits $FF_1$ to $FF_{13}$ in the first pulse decoding circuit block 1. While the clear terminals CL of said ET.FF circuits are in an "H" state by means of pulse (a), hence, so long as said waveform of (c) is in an "H" and the leading edge of the pulse appears at the clock terminals CK of said ET.FF circuits respectively, the "H" state at the Q output of said ET.FF circuits continue until said clear terminals CL become "L".

Namely, such a pulse of 2×d (μs) width being an output pulse of said AND gate $AND_3$ is the one for partitioning and selecting only thirteen information pulses $C_1, A_1, \ldots D_4$ belonging to the first signal train #1, and said pulse is decided by means of the delay time set value of said second delay circuit $DL_2$.

Thus, such signal pulses open the gates for only the allowable jitter time from the leading edge of the bracket pulse in said first signal #1 and these signal pulses to which belongs the signal #1 output with each successive delay at the respective intermediate taps of said first delay circuit $DL_1$ and which are inputted during said period of time continue while the waveform of (a) is in an "H" state as shown at (g) in FIG. 1B. As to the outputs from said AND gates $AND_4$ to $AND_{16}$ to which are inputted said signals (outputs from $FF_1$ to $FF_{13}$) as well as the output of said waveform shaping circuit $WS_1$, i.e., the signal in (e) of FIG. 1B, when pulses exist at the positions of thirteen pulses $C_1, A_1, \ldots D_4$ belonging to said #1 signal, a pulse having a 0.45 μs pulse width is output with respect to such an AND gate output corresponding to said pulses as such in FIG. 1B (h). As a result, only the first signal #1 in the order of time can be extracted from among a plurality of incoming signals which overlap.

Furthermore, the output from said second AND gate $AND_2$ is inputted to the input terminals D of the flip-flop circuits $FF_{14}$ to $FF_{26}$ in said second pulse decoding circuit block 2 so that said $FF_1$ to $FF_{13}$ in said first pulse decoding circuit block 1 become inoperative and at the same time the flip-flops $FF_{14}$ to $FF_{26}$ in said second pulse decoding circuit block 2 become operable; thereafter an "H" state appear at the Q output by means of the leading edge of the pulse inputted to the clock terminals (CK) of said flip-flop circuits, and such a condition continues until said FF circuits are cleared.

On one hand, when an "H" level is inputted to the OR circuit to which are inputted thirteen Q outputs from said flip-flop circuits $FF_{14}$ to $FF_{26}$ to at least one of the inputs, an "H" level signal pulse is inputted to the waveform shaping circuit $WS_2$ of the succeeding stage to produce a bracket decoding pulse $BKT_2$ of 0.45 μs width, and at the same time the output from said OR circuit OR is delayed by the allowable jitter time d (=0.2 μs) by means of the third delay circuit $DL_3$, and it is inputted to the clock terminal of the flip-flop circuit $FF_{27}$ for gate control. The resulting $\overline{Q}$ output is commonly connected with one input of each of said AND gates $AND_{30}$ to $AND_{42}$ so that said thirteen AND gates become operative during a period where said $\overline{Q}$ output is an "H".

Accordingly, as is apparent from the time chart relating to (i) through (p) in FIG. 1B, the operation in the above described respective parts is such that said second pulse decoding circuit block 2 allows other information pulses to pass only during a period extending from the leading edge of the most advanced pulse in a specified pulse position of one of the thirteen information pulses $C_1, A_1, \ldots D_4$ belonging to the second signal #2 from among overlapping incoming information signals to allowable jitter time d (=0.2 μs), so that only such pulses having leading edges within the allowable jitter time are extracted as the information pulses belonging to said signal #2.

Thus, two prior arriving signals #1 and #2 from among #1 through #3 overlapping information pulses can be independently discriminated as mentioned above.

In order to extract the third signal #3, one more stage of the same pulse decoding circuit block as said second block 2 may be provided, and the Q output from the flip-flop $FF_{27}$ for gate control in said block 2 may be connected to the D terminal of the flip-flop circuit in said third block, so that the third signal #3 can be discriminated as in the case described above. Likewise, when a number of blocks which are the same as said block 2 are connected in the same manner as that described above, an arbitrary number of information signals can be respectively discriminated.

As described above, according to the present invention, when a plurality of incoming overlapping signals which are composed of pulse trains having a prescribed relative relation in a positional relationship with respect to a reference pulse (bracket pulses $F_1$ and $F_2$ in the above example) are discriminated, gates are successively opened for only a period of time starting from said reference pulse and terminating with the allowable jitter to discriminate signals belonging to the pulse trains. As a result, even if a plurality of pulse trains are overlapping, they can correctly be distinguished from one another.

Therefore, the present invention should not be limited to the above-mentioned example, but it will be apparent that, for example, either of said $F_1$ and $F_2$ may be used as the reference pulse, and either of the leading or trailing edge of the pulse may also be utilized as the reference.

In addition, it will also be apparent that the respective elements constructing the respective circuits are not limited to those mentioned in the above embodiment, any element having the same functions as those of the former may be used.

As described above, the pulse discriminating system for answer signals and the like in transponders according to the present invention makes possible the discrimination of a plurality of overlapping pulse signal trains which could not have been discriminated heretofore; besides, the present system respectively separates these plural pulse signal trains so as to discriminate them. Thus, the present system is particularly suitable for transponders mounted in aircraft which receive frequently overlapping reply signals and the like. In this respect, precision in discrimination can be significantly improved by the pulse discriminating system according to the present invention.

I claim:

1. A pulse discriminating system for discriminating reply signals from transponders wherein there are a plurality of overlapping incoming pulse signals, and wherein each of said plurality of pulse signals are composed of a reference pulse and a number of information pulses n, n being a positive integer, having a prescribed time relationship with respect to said reference pulse as in reply signals from transponders, said system comprising: a means for time discriminating only information pulses belonging to a first of said plurality of incoming pulse signals by a gate circuit means which allows signals to pass only for a prescribed period of time in accordance with the reference pulse of said first incoming pulse signal; at least one means for discriminating only information pulses belonging to another of said plurality of incoming pulse signals which is slightly delayed from said first or following incoming pulse signals by another gate circuit means which allows signals to pass only for a prescribed period of time in accordance with said delayed information pulses, wherein said prescribed period of time for opening each of said another respective gate circuit means is set in relation to a maximum allowable jitter time of each of said information pulses.

2. A pulse discriminating system as recited in claim 1, further comprising a waveshaping means connected to said gate circuit means so as to cause said gate circuit means to allow signals to pass beginning at a time equal to the time of the occurrence of a leading edge of said reference pulse plus the maximum allowable jitter time of said information pulses.

3. A pulse discriminating system as recited in claim 1, further comprising a means connected to said another gate circuit means for causing said another gate circuit means to allow signals to pass only for a prescribed period of time equal to a leading edge of said reference pulse plus twice the maximum allowable jitter time of said information pulses.

* * * * *